Figure 1:
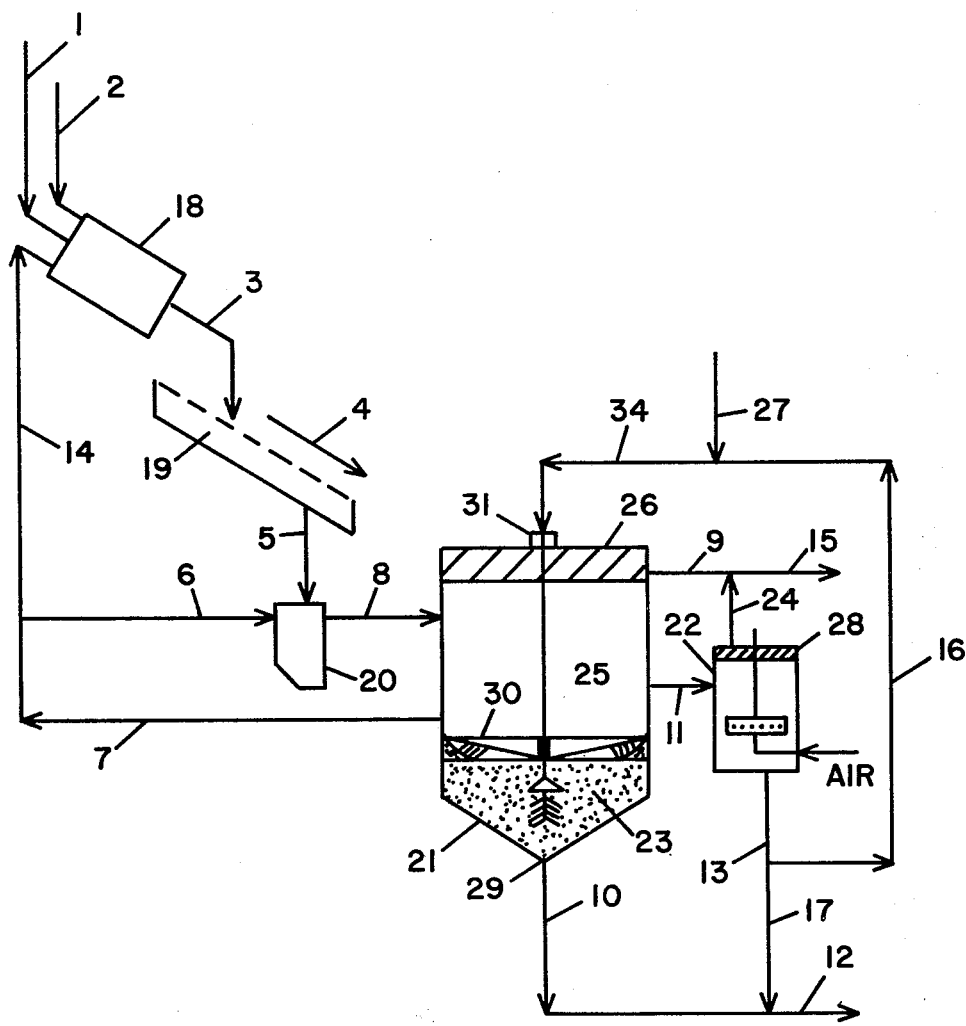

United States Patent [19]
Davitt

[11] 3,954,415
[45] May 4, 1976

[54] VESSEL FOR EXTRACTING BITUMEN FROM TAR SANDS

[75] Inventor: H. James Davitt, Edmonton, Canada

[73] Assignee: Sun Oil Company of Pennsylvania, Philadelphia, Pa.

[22] Filed: Oct. 21, 1974

[21] Appl. No.: 516,313

[52] U.S. Cl. .......... 23/270 R; 208/11 LE; 23/271 R; 196/14.52; 209/159; 209/169
[51] Int. Cl.² ............ B01D 11/02; C10G 1/00
[58] Field of Search .............. 209/169, 159; 208/11 LE, 45; 23/271 R, 270 R, 267 R; 196/14.52

[56] References Cited
UNITED STATES PATENTS

| | | | |
|---|---|---|---|
| 788,689 | 5/1905 | Wood | 23/271 R |
| 1,031,113 | 7/1912 | Garred | 209/159 |
| 1,131,222 | 3/1915 | Dorr | 23/271 |
| 1,807,263 | 5/1931 | Walter | 23/270 R |
| 1,861,163 | 5/1932 | Ray | 209/159 |
| 2,257,362 | 9/1941 | Zitkowski | 23/270 R |
| 2,560,809 | 7/1951 | Martin | 209/159 |
| 2,871,180 | 1/1959 | Lowman | 208/11 LE |
| 2,903,407 | 9/1959 | Fischer | 208/11 LE |
| 2,906,401 | 9/1959 | Katz | 209/159 |
| 2,921,842 | 1/1960 | List | 23/270 R |
| 3,075,913 | 1/1963 | Scheffel | 208/11 LE |
| 3,374,062 | 3/1968 | Bowdish | 23/270 R |
| 3,390,402 | 6/1968 | Goerg | 23/270 R |
| 3,401,110 | 9/1968 | Floyd | 208/11 LE |
| 3,496,093 | 2/1970 | Camp | 208/11 LE |
| 3,642,129 | 2/1972 | McDaniel | 209/159 |
| 3,777,003 | 12/1974 | Mitterer | 23/270 R |
| 3,800,026 | 3/1974 | Morgan | 23/270 R |

FOREIGN PATENTS OR APPLICATIONS

| | | | |
|---|---|---|---|
| 611,587 | 12/1960 | Canada | 208/11 LE |
| 883,974 | 10/1971 | Canada | 208/11 LE |

Primary Examiner—Stephen J. Emery
Attorney, Agent, or Firm—J. Edward Hess; Donald R. Johnson; Richard P. Maloney

[57] ABSTRACT

An improved separation cell suitable for use in a hot water method for extracting bitumen from tar sands. The improvement lies substantially in the hollow inverted frusto-cone shaped bottom of the cell having a means for injecting hydroseparation liquid into the cavity formed by the frusto-conical bottom.

6 Claims, 2 Drawing Figures

VESSEL FOR EXTRACTING BITUMEN FROM TAR SANDS

CROSS-REFERENCES TO RELATED APPLICATIONS

This application is related to copending U.S. application Ser. No. 516,222 by Joseph C. Anderson and copending U.S. application Ser. No. 516,063 by Robert A. Baillie and H. James Davitt both of which are filed of even date herewith.

BACKGROUND OF THE INVENTION

Tar sands which are also known as oil sands and bituminous sands are siliceous materials which are impregnated with a heavy petroleum. The largest and most important deposits of the sands are the Athabasca sands, found in northern Alberta, Canada. These sands underlay more than 13,000 square miles at a depth of 0 to 2000 feet. Total recoverable reserves after extraction and processing are estimated at more than 300 billion barrels—just equal to the world-wide reserves of conventional oil. The tar sands are primarily silica, having closely associated therewith an oil film which varies from about 5 to 21 percent by weight, with a typical amount of 13 weight percent of the sand. The oil is quite viscous—6° to 8° API gravity—and contains typically 4.5 percent sulfur and 38 percent aromatics. The sands contain, in addition to the oil and sand components, clay and silt in quantities of from 1 to 50 weight percent, more usually 10 to 30 percent. The sands also contain a small amount of water, in quantities of 1 to 10 percent by weight, in the form of a capsule around the sand grains.

Several basic extraction methods have been known for many years for the separation of oil from the sands. The most important method which now has been proven commercially feasible is the hot water extraction process currently in use at Great Canadian Oil Sands, Ltd. plant located 20 miles north of Fort McMurray, Alberta, Canada.

One mode of the hot water process is disclosed in Canadian Pat. No. 841,581 issued May 12, 1970 to Floyd et al. This process provides that the bituminous sands are jetted with steam and mulled with a minor amount of hot water at temperatures of 170° to 190°F., and the resulting pulp is then dropped into a turbulent stream of circulating hot water and carried to a separation cell maintained at a temperature of about 185°F. In the separation cell, sand settles to the bottom as tailings and oil rises to the top in the form of a froth. An aqueous middlings layer comprising clay and silt and about 1 to 5 weight percent bitumen based on the weight of the middlings is formed between these layers. This basic process may be combined with a scavenger step for further treatment of the middlings layer obtained from the primary separation step to recover an additional amount of oil therefrom.

The middlings layer withdrawn from the hot water separation cell in a hot water extraction process contains most of the silt and clay as well as some bitumen. In the hot water extraction process disclosed by Floyd et al. above, a stream of middlings is withdrawn from the primary extraction zone and recycled to the conditioning vessel of the hot water process. Also, a second stream of the middlings is transferred from the primary extraction zone to an air scavenger zone wherein air is bubbled into the material in the scavenger zone to cause flotation of additional bitumen from the middlings material. This bitumen is then recovered as a froth and combined with the bitumen froth recovered from the primary extraction zone. The depleted middlings stream is normally thereafter discarded into a retention pond or in some circumstances combined with the sand tailings layer which was removed from the primary extraction zone and subsequently discarded.

Canadian Pat. No. 882,667 issued Oct. 5, 1971 to Erskine et al. provides a hot water process separation cell of the type which is suitable for use in a process as disclosed by Floyd et al. above. Essentially, this cell is a circular tank having a convex bottom with a sand tailings exit means at the center thereof, middlings outlets on the side walls of the cell, a center rotating shaft fitted with sand rakes on the bottom end, and froth skimmers situated on the upper end. The cell also has an overflow launder on the top of the tank walls to provide a means of recovering the bitumen froth product of the process.

Copending U.S. application Ser. No. 516,063 filed of even date herewith discloses an improvement in the hot water process provided by Floyd et al. Essentially, the improvement comprises inserting water below the upper surface of the sand tailings layer formed in the bottom of a hot water separation cell when extracting bitumen from tar sands. In the prior art process, the intersticies of the sand tailings layer in the bottom of a hot water separation cell are filled with bitumen-rich middlings material containing 2 to 5 weight percent bitumen. When the sand tailings layer is withdrawn from the settling cell and discarded, the bitumen-rich middlings are also removed from the cell and this quantity of bitumen is lost from the recovery process.

By displacing the bitumen-rich middlings from the intersticies of the sand tailings layer with other water, the bitumen-rich middlings is backed out of the intersticies of the tailings layer and remains in the process stream so that the bitumen in the middlings can be recovered as product. This method of displacing bitumen-rich fluids from the intersticies of the sand tailings layer with a bitumen-lean fluid is often referred to as a hydroseparation method for recovering bitumen from tar sands or simply a "hydroseparation hot water process" and the displacing fluid as the hydroseparation liquid.

It has been discovered that unfortunately the settling cell provided by Erskine et al. above does not readily lend itself to the hydroseparation hot water process. This shortcoming is due in part to the design of the bottom of the cell. Thus, a need for a new and improved hot water separation cell suitable for use in a hydroseparation hot water process has become apparent. The apparatus of the present invention provides one means of filling that need.

DESCRIPTION OF THE INVENTION

The present invention is a novel hot water extraction cell specifically designed to utilize hydroseparation methods for recovering bitumen from tar sands. More particularly, the separation cell of the present invention is a cell which permits effective recovery of bitumen froth while concurrently providing for the use of hydroseparation methods thereby substantially reducing the loss of bitumen to waste streams.

Specifically, the present invention is a hot water extraction cell having a hollow inverted frusto-cone shaped bottom having a hydroseparation liquid distributor disposed in the internal cavity thereof. Recovery of bitumen from tar sands via hot water extraction utilizing the apparatus of the present invention provides a process wherein the bottom of the separation cell is continually full with sand and hydroseparation fluid. Using the separation cell of the present invention, middlings material containing bitumen which is not recovered in the primary separation cell remains in the middlings stream and does not fill the intersticies of the sand tailings layer in the bottom of the cell and is thus available for recovery in a subsequent scavenging step.

In general, the present invention comprises a hot water process separation cell suitable for use in extracting bitumen from tar sands utilizing hydroseparation techniques comprising:

a. a tank having vertical side walls and a bottom in the shape of a hollow inverted frusto-cone, the larger opening of the frusto-cone being attached to the lower end of the side walls, said cone having an angle of slope as measured between the side walls of the cone and a plane perpendicular to the axis of the cone of at least 15°;

b. a hydroseparation liquid distributor centrally disposed within the frusto-conical bottom immediately adjacent to the smaller opening therein, said distributor having openings for delivering hydroseparation liquid into the frusto-conical bottom cavity;

c. means for delivering hydroseparation liquid to said hydroseparation liquid distributor;

d. a sand tailings discharge outlet connected to the smaller opening of the frusto-conical bottom;

e. at least one middlings outlet in the side wall of said cell for withdrawing middlings material therefrom;

f. an overflow launder on the upper end of said side walls and positioned adjacent to said tank to receive bitumen froth overflow and g. a tar sands pulp inlet to said tank.

Figure 2:
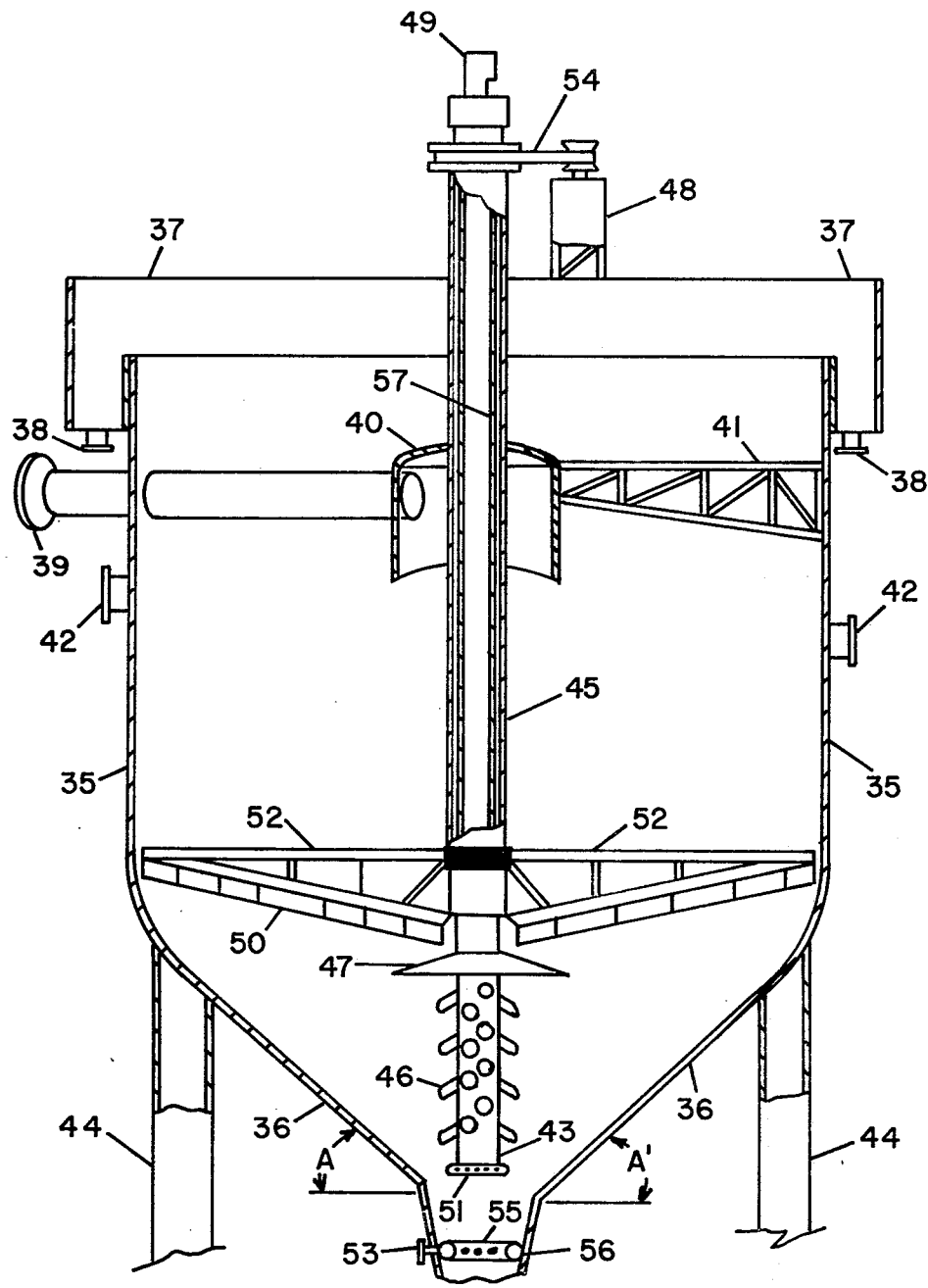

The present invention can be more easily understood when described in accordance with illustrations set forth in FIGS. 1 and 2 herein provided. FIG. 1 illustrates the hot water extraction process in flow diagram form as generally disclosed in the Floyd et al. patent noted above with the improvement of the incorporation of the hydroseparation hot water extraction cell of the present invention. FIG. 2 is an illustration of the detail of one mode of the hot water extraction cell of the present invention.

Referring to FIG. 1, bituminous tar sands are fed into the hot water extraction system through line 1 where they first pass into conditioning zone 18. Water and steam are introduced from 2 into the conditioning zone along with recycled middlings from line 14 and are mixed with the sands. Total water so introduced is a minor amount based on the weight of the tar sands and generally is in the range of 10 to 45 percent by weight of the mixture. Enough steam is introduced to raise the temperature in the conditioning zone to within the range of 130° to 210°F. and preferably above 170°F. and most preferably about 185°F. The water added into the mixing zone as indicated can include a middlings recycle drag stream which can be withdrawn from primary extraction zone 21 and transferred via line 7 into line 14 and thereafter into conditioning vessel 18 as indicated in the drawing.

An alkaline reagent can also be added to the conditioning zone in the amount of 0.1 to 3.0 pounds per ton of tar sand. The amount of such alkaline reagent preferably is regulated to maintain the pH of middlings layer 25 in the separation zone 21 within the range of about 7.5 to 9.0 with the best results being obtained at a pH in the range of about 8.0 to 8.5. The quantity of alkaline reagent that needs to be added to maintain the pH in the desired range can vary from time to time as the composition of the tar sands obtained from the mine site varies. Alkaline reagents suitable for use include caustic soda, sodium carbonate, or sodium silicate although any of the other alkaline reagents known in the art for this application can be used if desired.

The mixture from conditioning zone 18 can be transferred via line 3 to screen 19 where oversized matter such as rock and tar sand or clay lumps are removed as indicated at 4. The pulp then passes as indicated via line 5 into sump 20 where it is diluted with additional water from line 6 which can also be recycled middlings withdrawn from extraction zone 21 as well as fresh water which can be added to line 6 from an outside source not shown.

The addition of water to the pulp in sump 20 dilutes the pulp to a pumpable viscosity so that it can easily be transferred into separation zone 21 via line 8 as shown. Additional water can also be added to screen 19 to wash pulp through the screen and act as a diluent for the pulp if desired. In normal practice, the total amount of water added to the tar sand pulp as liquid water and steam prior to the separation step should be in the range 0.2 to 3.0 pounds of water per pound of tar sand being processed. The water requirements for the separation zone, of course, are contingent upon the quantity of silt and clay which the tar sands contain as compared to the bitumen content of the tar sands. These conditions are amply described in the Floyd et al. patent noted above as well as other references in the prior art.

Separation zone 21 includes the improved hydroseparation features which are the contributions of the present invention. Separation zone 21 is illustrated as containing the upper froth layer 26, the middlings layer 25, and the sand tailings layer 23. The hydroseparation liquid distributor is located within the sand tailings layer 23. Separation zone 21 also contains sand rake 30 as well as exit means 29 having a withdrawal outlet pipe 10 which feeds into line 12 which thereafter is utilized to discard the sand tailings layer from separation zone 21. Also, means for rotating sand rake 30 is indicated at 31. Hydroseparation liquid is transferred into extraction cell 21 via line 34 which carries hydroseparation liquid from lines 27 and/or 16.

In separation zone 21, the slurry mixture normally separates into an upper bitumen froth layer as indicated by 26, a middlings layer indicated by 25, and sand tailings layer indicated by 23. The bitumen froth is recovered from separation zone 21 via line 9. The tailings layer of extraction zone 21 containing sand and the hydroseparation liquid medium is withdrawn via line 10 through exit 29 and transferred into line 12 for discard. A first middlings drag stream can be withdrawn from separation zone 21 via line 7 for transfer into line 14 or line 6 as the hereinbefore disclosed recycle diluent for the tar sands pulp. A second middlings stream can be withdrawn from separation zone 21 and transferred via line 11 into scavenger zone 22. Additional bitumen froth 28 is recovered from the middlings stream in zone 22 via air flotation. The additional froth 28 from zone 22 is transferred via line 24 into line 15 wherein it is combined with the froth recovered from the separation zone 21 via line 9. The combined froths can thereafter be processed to usable synthetic petroleum in the manner known in the art.

A depleted middlings stream from scavenger zone 22 is withdrawn via line 13 and, if desired, all or part of this stream can be transferred via line 16 into line 34 for use in the primary extraction zone 21 as the hydroseparation liquid. Also, the scavenger tailings can be transferred from line 13 into line 17 and thereafter into line 12 for addition to the primary cell tailings to be discarded, if desired.

In FIG. 1, the general process of one mode of operation of the hot water extraction method for recovering bitumen from tar sands is provided. Generally, the hydroseparation cell which is the novel improvement of the present invention is shown within this process. In order to give a more detailed description of one mode of the apparatus of the present invention, FIG. 2 is provided.

Referring to FIG. 2, a hot water extraction cell is a tank having a circular vertical wall 35 with middlings outlets 42 located generally midway between the top end and bottom end of the wall. Disposed on the upper end of the tank is an overflow launder 37 having outlets 38 for transfer of the overflow liquids from the launder for further processing.

The tank contains a hollow inverted frusto-conical shaped bottom 36. The larger opening of the frusto-cone is attached to the lower end of the vertical wall 35. The smaller opening of the frusto-cone is attached to exit means 56. Exit 56 provides a means for removing the sand tailings layer from the bottom of the cell. Disposed within the cavity formed by the frusto-conical bottom of the cell is a hydroseparation liquid distributor 43. Hydroseparation liquid distributor 43 can be a hollow tube having an inlet means at one end for receiving hydroseparation liquid and also having distribution outlets 46 as indicated on the drawing for dispersing the liquid into the bottom of the cell.

Situated immediately above the uppermost distribution outlet 46 on the hydroseparation liquid distributor 43 is shed baffle 47. This baffle is generally in the shape of an inverted saucer or frusto-cone and is provided to inhibit a channel being formed between the middlings zone (25 in FIG. 1) and the discharge cone 56 of the cell through the sand tailings layer (33 in FIG. 1) in the bottom of the cell. In normal operation, the level of the sand tailings layer in the cell is maintained at a point between the sand rakes 50 and the uppermost part of shed baffle 47.

The hydroseparation liquid distributor can also contain outlets in the form of a perforated flange 51 on the end of distributor 43. The flange outlets are arranged to provide hydroseparation liquid to the exit opening in the bottom of the cell to aid the free flow of sand from the cell. Also, located within exit cone 56 is a perforated cone flush pipe 55 or similar fluid delivery means which provides additional flushing fluid to exit cone 56 to aid in transferring sand tailings from the separation cell. Fluid is supplied to the cone flush means by inlet 53 attached to the cone flush pipe and located outside of exit cone 56.

Also, disposed in the cell is sand rake 50 attached to support arms 52 which in turn are affixed to the central rotating shaft 45 centrally disposed within the cell. This central rotating shaft 45 to which the sand rake 50 is attached is powered by means of drive belt 54 which is connected to power source 48.

Connected to the hydroseparator distributor is delivery means 57 which can be a hollow tube through which the hydroseparator liquid is provided to the distributor. In one aspect of the apparatus, the hydroseparator liquid delivery means 57 is concentric with and located within hollow rotating shaft 45. The hydroseparation delivery means is supplied by line 49 connected thereto which is supplied by line 34 of FIG. 1.

One important aspect of the apparatus of the present invention is the slope of the sides of the frusto-conical bottom. As shown in the drawing, this slope is indicated by angle A which is the external angle between the side of the frusto-conical bottom and a plane perpendicular to the axis of the cone. This angle is herein defined as slope of the bottom of the tank. To facilitate continuous flow of sand tailings on the bottom of the cell to the exit therein, this angle should be at least 15°. The most effective angle for this cell bottom is in the range of 30° to 60° and most preferably the angle is at about 45°.

Tar sands pulp is delivered to the separation cell via feed inlet means 39 which communicates with feed well 40 centrally disposed within the separation cell. Feed well 40 is supported by support means 41 attached to cell wall 35. The entire separation cell is supported by support means 44.

The sand rake in the cell serves to prevent sand build up along the cell walls which, if permitted, could interfere with the normal operation of the cell. The cell is operable without having sand rakes but the use of the raking system is preferable. Also, the shed baffle 47 located above the hydroseparation liquid distributor is not absolutely essential to the operation of the cell. However, a cell containing the shed baffles 47, as shown in FIG. 2, is preferable.

The improved hot water extraction cell of the present invention incorporates the inverted hollow frusto-conical bottom having a hydroseparation liquid distributor located within the cavity of the frusto-conical bottom of the cell and near the sand tailings exit of the cell. In the operation of the cell, it is also below the surface of the sand tailings layer in the bottom of the cell.

As stated above, by this unique combination of a hydroseparation liquid distributor within a hollow inverted frusto-cone shaped bottom, bitumen-rich middlings material is not lost through the bottom sand tailings discharge means of the cell thereby improving recovery of bitumen from the tar sands feed.

The invention claimed is:

1. A hot water process separation cell suitable for use in extracting bitumen from tar sands utilizing hydroseparation techniques comprising:
   a. a tank having a vertical side wall and a bottom in the shape of a hollow inverted frusto-cone, the larger opening of the frusto-cone being attached to the lower end of the side wall, said cone having a slope as measured between the side wall of the cone and a plane perpendicular to the axis of the cone of at least 15°;
   b. a hydroseparation liquid distributor centrally disposed within the frusto-conical bottom immediately adjacent to the smaller opening therein, said distributor having openings for delivering hydroseparation liquid into the frusto-conical bottom cavity;
   c. means for delivering hydroseparation liquid to said hydroseparation liquid distributor;

d. a sand tailings discharge outlet connected to the smaller opening of the frusto-conical bottom comprising a discharge cone containing a means for delivering flush water into said cone;
e. at least one middlings outlet in the side wall of said cell for withdrawing middlings material therefrom;
f. an overflow launder on the upper end of said side wall and positioned adjacent to said tank to receive bitumen froth overflow,
g. a tar sands pulp inlet to said tank
h. a shed baffle located immediately above said hydroseparation liquid distributor and within said frusto-conical bottom, said shed baffle being in the shape of an inverted frusto-cone; and
i. a hollow rotatable center shaft running as a vertical axis from the top of the tank to the lower end of the vertical side wall, a means for rotating said shaft located at the upper end thereof and a sand rake connected to the lower end of said shaft.

2. The cell of claim 1 wherein the slope of the frusto-conical bottom is in the range of 15° to 60°.

3. The cell of claim 1 wherein the slope of the frusto-conical bottom is in the range of 30° to 45°.

4. The cell of claim 1 in which the hydroseparator liquid distributor comprises an elongated hollow tube closed on one end and having an opening at the opposite end to receive hydroseparation liquid, said tube additionally having a multiplicity of exit ports dispersed over the walls thereof for distributing hydroseparator liquid into the cavity of said frusto-conical bottom.

5. The cell of claim 2 in which the hydroseparator liquid distributor comprises an elongated hollow tube closed on one end and having an opening at the opposite end to receive hydroseparation liquid, said tube additionally having a multiplicity of exit ports dispersed over the walls thereof for distributing hydroseparator liquid into the cavity of said frusto-conical bottom.

6. The cell of claim 3 in which the hydroseparator liquid distributor comprises an elongated hollow tube closed on one end and having a opening at the opposite end to receive hydroseparation liquid, said tube additionally having a multiplicity of exit ports dispersed over the walls thereof for distributing hydroseparator liquid into the cavity of said frusto-conical bottom.

* * * * *